US012087218B2

(12) United States Patent
Liao et al.

(10) Patent No.: US 12,087,218 B2
(45) Date of Patent: Sep. 10, 2024

(54) DISPLAY COMPENSATION MODULE, DISPLAY COMPENSATION METHOD AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Chenghao Liao, Beijing (CN); Guoqiang Wu, Beijing (CN); Yuanzhou Hu, Beijing (CN); Xiaohuan Chang, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/913,793

(22) PCT Filed: Nov. 12, 2021

(86) PCT No.: PCT/CN2021/130334
§ 371 (c)(1),
(2) Date: Sep. 22, 2022

(87) PCT Pub. No.: WO2022/156322
PCT Pub. Date: Jul. 28, 2022

(65) Prior Publication Data
US 2024/0203340 A1 Jun. 20, 2024

(30) Foreign Application Priority Data
Jan. 22, 2021 (CN) ......................... 202110087871.1

(51) Int. Cl.
*G09G 3/3225* (2016.01)

(52) U.S. Cl.
CPC ... *G09G 3/3225* (2013.01); *G09G 2300/0842* (2013.01); *G09G 2320/0233* (2013.01);
(Continued)

(58) Field of Classification Search
CPC ... G09G 3/30–3291; G09G 2300/0842; G09G 2300/0233; G09G 2300/0242; G09G 2300/0274
See application file for complete search history.

(56) References Cited

U.S. PATENT DOCUMENTS

2015/0371594 A1 12/2015 Huang et al.
2017/0140694 A1 5/2017 Chen
(Continued)

FOREIGN PATENT DOCUMENTS

CN 101256738 A 9/2008
CN 101409051 A 4/2009
(Continued)

OTHER PUBLICATIONS

CN 202110087871.1 first office action.
PCT/CN2021/130334 international search report and written opinion.

*Primary Examiner* — Hang Lin
(74) *Attorney, Agent, or Firm* — IPro, PLLC

(57) ABSTRACT

A display compensation module, a display compensation method and a display device are provided. The display compensation module includes a search circuit, a compensation control circuit and a compensation circuit. The search circuit is configured to obtain compensation information corresponding to the display gray-scale value of the M-th row in the N-th frame of display data and the display gray-scale value of the M-th row in the (N−1)-th frame of display data, and when the compensation information indicates that the display gray-scale values of at least part of columns of sub-pixels in the M-th row in the display panel
(Continued)

increase from the (N−1)-th frame to the N-th frame, apply the first control signal to the compensation control circuit; N is an integer greater than 1, M is a positive integer. The compensation control circuit is configured to: determine whether to perform a gray-scale compensation according to the display gray-scale value of the M-th row in the N-th frame of display data after receiving a first control signal. The compensation circuit is configured to compensate the display gray-scale value of the M-th row in the N-th frame of display data after receiving the compensation control signal.

14 Claims, 5 Drawing Sheets

(52) U.S. Cl.
CPC ............... *G09G 2320/0242* (2013.01); *G09G 2320/0271* (2013.01)

(56) References Cited

U.S. PATENT DOCUMENTS

| | | | | |
|---|---|---|---|---|
| 2018/0012563 | A1* | 1/2018 | Lee | G09G 5/10 |
| 2018/0061319 | A1 | 3/2018 | Hong | |
| 2019/0130803 | A1 | 5/2019 | Zhang et al. | |
| 2019/0189045 | A1 | 6/2019 | Hwang et al. | |
| 2020/0193910 | A1* | 6/2020 | Park | G09G 3/3266 |
| 2021/0012728 | A1 | 1/2021 | Shan | |
| 2023/0029179 | A1 | 1/2023 | Chen et al. | |

FOREIGN PATENT DOCUMENTS

| | | | |
|---|---|---|---|
| CN | 102394044 | A | 3/2012 |
| CN | 102842297 | A | 12/2012 |
| CN | 104793423 | A | 7/2015 |
| CN | 104900209 | A | 9/2015 |
| CN | 105208365 | A | 12/2015 |
| CN | 107564471 | A | 1/2018 |
| CN | 111640390 | A | 9/2020 |
| CN | 112133257 | A | 12/2020 |
| CN | 112216243 | A | 1/2021 |
| CN | 112863446 | A | 5/2021 |
| KR | 20190064200 | A | 6/2019 |
| TW | 200841297 | A | 10/2008 |

* cited by examiner

| | | display gray-scale value of current frame | | | | | | |
|---|---|---|---|---|---|---|---|---|
| | | 0 | 15 | 31 | ... | 223 | 239 | 255 |
| display gray -scale value of the previous frame | 0 | a1_r<br>a1_g<br>a1_b | a2_r<br>a2_g<br>a2_b | a3_r<br>a3_g<br>a3_b | ... | a14_r<br>a14_g<br>a14_b | a15_r<br>a15_g<br>a15_b | a16_r<br>a16_g<br>a16_b |
| | 15 | x | b2_r<br>b2_g<br>b2_b | b3_r<br>b3_g<br>b3_b | ... | b14_r<br>b14_g<br>b14_b | b15_r<br>b15_g<br>b15_b | b16_r<br>b16_g<br>b16_b |
| | 31 | x | x | c3_r<br>c3_g<br>c3_b | ... | c14_r<br>c14_g<br>c14_b | c15_r<br>c15_g<br>c15_b | c16_r<br>c16_g<br>c16_b |
| | ... | x | x | x | ... | ... | ... | ... |
| | 223 | x | x | x | x | n14_r<br>n14_g<br>n14_b | n15_r<br>n15_g<br>n15_b | n16_r<br>n16_g<br>n16_b |
| | 239 | x | x | x | x | x | o15_r<br>o15_g<br>o15_b | o16_r<br>o16_g<br>o16_b |
| | 255 | x | X | x | x | x | x | p16_r<br>p16_g<br>p16_b |

Fig.3

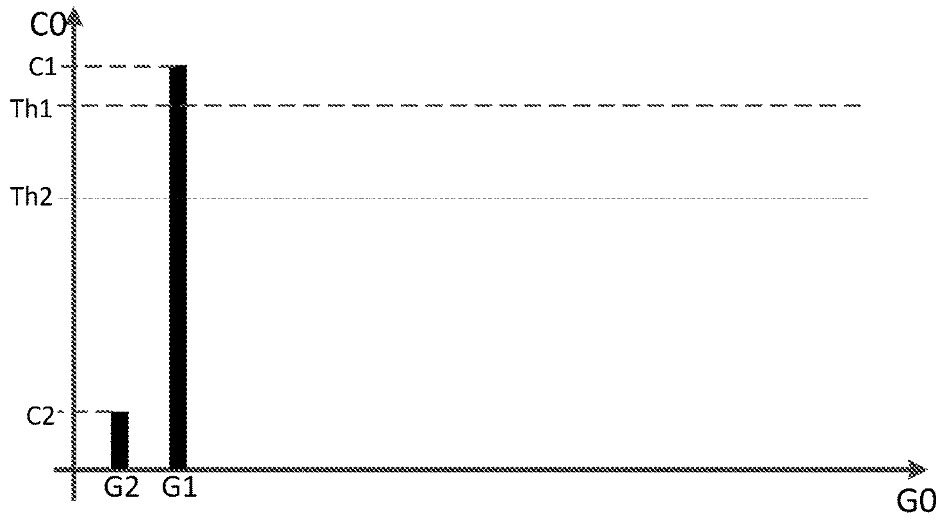

Fig.4

DISPLAY COMPENSATION MODULE, DISPLAY COMPENSATION METHOD AND DISPLAY DEVICE

CROSS-REFERENCE TO RELATED APPLICATION

This application is the U.S. national phase of PCT Application PCT/CN2021/130334 filed on Nov. 12, 2021, which claims priority to Chinese Patent Application No. 202110087871.1 filed in China on Jan. 22, 2021, the entire contents of which are hereby incorporated by reference.

TECHNICAL FIELD

The present disclosure relates to the field of display compensation, in particular to a display compensation module, a display compensation method and a display device.

BACKGROUND

In a related AMOLED (Active-matrix organic light-emitting diode) display product, due to a difference between a red AMOLED material, a green AMOLED material, and a blue AMOLED material, when a predetermined display screen is displayed, when a low display gray-scale is switched to a high display gray-scale, a luminance of a first frame is different from a normal luminance by less than 20% to 30%, and the difference is different for a red sub-pixel, a green sub-pixel, and a blue sub-pixel, which causes a color and a luminance of the first frame to deviate when the low display gray-scale is switched to the high display gray-scale in the conventional AMOLED display product, and if the switching is continuous, such as a sliding of a mobile phone interface, a significant color and luminance deviation phenomenon is generated, thereby causing a display failure.

SUMMARY

In a first aspect, the embodiment of the present disclosure provides a display compensation module, applied to a display panel, where the display panel includes a plurality of rows and a plurality of columns of sub-pixels, the display compensation module includes a search circuit, a compensation control circuit and a compensation circuit, where the search circuit is configured to obtain, based on a display gray-scale value of an M-th row in a N-th frame of display data, a display gray-scale value of an M-th row in a (N−1)-th frame of display data and a preset compensation gray-scale search table, compensation information corresponding to the display gray-scale value of the M-th row in the N-th frame of display data and the display gray-scale value of the M-th row in the (N−1)-th frame of display data, and when the compensation information indicates that the display gray-scale values of at least part of columns of sub-pixels in the M-th row in the display panel increase from the (N−1)-th frame to the N-th frame, apply the first control signal to the compensation control circuit; N is an integer greater than 1, M is a positive integer;

the compensation control circuit is electrically connected to the search circuit and is configured to: determine whether to perform a gray-scale compensation according to the display gray-scale value of the M-th row in the N-th frame of display data after receiving a first control signal, and send a compensation control signal to the compensation circuit when the gray-scale compensation is needed, and send a second control signal to the compensation circuit when the gray-scale compensation is not needed;

the compensation circuit is electrically connected to the search circuit and the compensation control circuit, and is configured to: receive the compensation information, compensate the display gray-scale value of the M-th row in the N-th frame of display data according to a compensation display gray-scale value in the compensation information after receiving the compensation control signal, to obtain and output the compensated display gray-scale value, and control and output the display gray-scale value of the M-th row in the N-th frame of display data after receiving the second control signal.

Optionally, the search circuit is further configured to send a third control signal to the compensation circuit when the compensation information indicates that the display gray-scale values of all the sub-pixels in the M-th row in the display panel do not increase from the (N−1)-th frame to the N-th frame;

the compensation circuit is configured to output the display gray-scale value of the M-th row in the N-th frame of display data after receiving the third control signal.

Optionally, the compensation control circuit is configured to determine that the gray-scale compensation is needed when the compensation control circuit determines that the display gray-scale value of the M-th row in the N-th frame of display data is the display gray-scale value of the one row in the display data corresponding to a predetermined display image, and is configured to determine that gray-scale compensation is not needed when the compensation control circuit determines that the display gray-scale value of the M-th row in the N-th frame of display data is not the display gray-scale value of one row in the display data corresponding to a predetermined display image.

Optionally, the compensation control circuit is further configured to generate a histogram according to the display gray-scale value of the M-th row in the N-th frame of display data, and determine whether the display gray-scale value of the M-th row in the N-th frame of display data is the display gray-scale value of one row in the display data corresponding to a predetermined display image according to the histogram.

Optionally, when the compensation information indicates that the display gray-scale values of at least a part of columns of subpixels in the M-th row in the display panel increase from the (N−1)-th frame to the N-th frame, the compensation information includes a compensation display gray-scale value corresponding to display gray-scale value of the M-th row in the N-th frame of display data and the display gray-scale value of the M-th row in the (N−1)-th frame of display data.

Optionally, the compensation circuit includes a compensation voltage supply sub-circuit, an adder, and an output sub-circuit;

the compensation control circuit is electrically connected to the compensation voltage supply sub-circuit and the output sub-circuit and is configured to: send the compensation control signal to the compensation voltage supply sub-circuit and the output sub-circuit when the gray-scale compensation is needed, and send the second control signal to the output sub-circuit when the gray-scale compensation is not needed;

the compensation voltage supply sub-circuit is electrically connected to the search circuit and the adder, and is configured to: receive the compensation information from the search circuit and supply the compensation display gray-scale value in the compensation information to the adder after receiving the compensation control signal;

the output sub-circuit is electrically connected to the adder and configured to control the adder to compensate the display gray-scale value of the M-th row in the N-th frame of display data according to the compensation display gray-scale value in the compensation information after receiving the compensation control signal, to obtain the compensated display gray-scale value, and the output sub-circuit is further configured to output the compensated display gray-scale value and control and output the display gray-scale value of the M-th row in the N-th frame of display data after receiving the second control signal.

Optionally, the search circuit is further configured to send a third control signal to the output sub-circuit when the compensation information indicates that the display gray-scale values of all sub-pixels in the M-th row in the display panel do not increase from the (N−1)-th frame to the N-th frame;

the output sub-circuit is configured to output the display gray-scale value of the M-th row in the N-th frame of display data after receiving the third control signal.

Optionally, the display compensation module further includes an extraction circuit and a storage circuit;

the extraction circuit is configured to extract a display gray-scale value of each row in the N-th frame of display data and a display gray-scale value of each row in the (N−1)-th frame of display data, and store a display gray-scale value of each row in the (N−1)-th frame of display data in the storage circuit before the N-th frame;

the search circuit is configured to, before the N-th frame, receive the N-th frame of display data, call the display gray-scale values of all rows in the (N−1)-th frame of display data in the storage circuit, and obtain compensation information corresponding to the display gray-scale value of the M-th row in the N-th frame of display data and the display gray-scale value of the M-th row in the (N−1)-th frame of display data according to the preset compensation gray-scale search table.

In a second aspect, a display compensation method is provided in the present disclosure, applied to the display compensation module hereinabove, and including:

obtaining, by the search circuit, based on a display gray-scale value of an M-th row in a N-th frame of display data, a display gray-scale value of an M-th row in a (N−1)-th frame of display data and a preset compensation gray-scale search table, compensation information corresponding to the display gray-scale value of the M-th row in the N-th frame of display data and the display gray-scale value of the M-th row in the (N−1)-th frame of display data, and when the compensation information indicates that the display gray-scale values of at least part of columns of sub-pixels in the M-th row in the display panel increase from the (N−1)-th frame to the N-th frame, applying, by the search circuit, the first control signal to the compensation control circuit; N is an integer greater than 1, M is a positive integer;

determining, by the compensation control circuit, whether to perform a gray-scale compensation according to the display gray-scale value of the M-th row in the N-th frame of display data after receiving a first control signal, and sending, by the compensation control circuit, a compensation control signal to the compensation circuit when the compensation control circuit determines that the gray-scale compensation is needed, and sending, by the compensation control circuit, a second control signal to the compensation circuit when the compensation control circuit determines that the gray-scale compensation is not needed;

receiving, by the compensation circuit, the compensation information, compensating, by the compensation circuit, the display gray-scale value of the M-th row in the N-th frame of display data according to a compensation display gray-scale value in the compensation information after receiving the compensation control signal, to obtain and output the compensated display gray-scale value, and controlling and outputting, by the compensation circuit, the display gray-scale value of the M-th row in the N-th frame of display data after receiving the second control signal.

Optionally, the display compensation method further includes:

sending, by the search circuit, a third control signal to the compensation circuit when the compensation information indicates that the display gray-scale values of all the sub-pixels in the M-th row in the display panel do not increase from the (N−1)-th frame to the N-th frame;

outputting, by the compensation circuit, the display gray-scale value of the M-th row in the N-th frame of display data after receiving the third control signal.

Optionally, the determining, by the compensation control circuit, whether to perform the gray-scale compensation according to the display gray-scale value of the M-th row in the N-th frame of display data includes:

determining, by the compensation control circuit, that the gray-scale compensation is needed when the compensation control circuit determines that the display gray-scale value of the M-th row in the N-th frame of display data is the display gray-scale value of the one row in the display data corresponding to a predetermined display image, and determining, by the compensation control circuit, that the gray-scale compensation is not needed when the compensation control circuit determines that the display gray-scale value of the M-th row in the N-th frame of display data is not the display gray-scale value of one row in the display data corresponding to a predetermined display image.

Optionally, the compensation circuit includes a compensation voltage supply sub-circuit, an adder, and an output sub-circuit; the display compensation method further includes:

when the compensation control circuit determines that the gray-scale compensation is needed, sending the compensation control signal to the compensation voltage supply sub-circuit and the output sub-circuit, and when the compensation control circuit determines that the gray-scale compensation is not needed, sending the second control signal to the output sub-circuit;

receiving, by the compensation voltage supply sub-circuit, the compensation information from the search circuit, and supplying, by the compensation voltage supply sub-circuit, the compensation display gray-scale value in the compensation information to the adder after receiving the compensation control signal;

controlling, by the output sub-circuit, the adder to compensate the display gray-scale value of the M-th row in the N-th frame of display data according to the compensation display gray-scale value in the compensation information after receiving the compensation control signal, to obtain the compensated display gray-scale value, and outputting, by the output sub-circuit, the compensated display gray-scale value and controlling and outputting, by the output sub-circuit, the display gray-scale value of the M-th row in the N-th frame of display data after receiving the second control signal.

Optionally, the display compensation method further includes:

sending, by the search circuit, a third control signal to the output sub-circuit when the compensation information indicates that the display gray-scale values of all sub-pixels in the M-th row in the display panel do not increase from the (N−1)-th frame to the N-th frame;

outputting, by the output sub-circuit, the display gray-scale value of the M-th row in the N-th frame of display data after receiving the third control signal.

In a third aspect, a display device including the display panel and the display compensation module hereinabove is provided in the present disclosure.

BRIEF DESCRIPTION OF THE DRAWINGS

FIG. 3 is a schematic diagram of a compensation gray-scale search table in at least one embodiment of the present disclosure;

FIG. 4 is a schematic diagram of a histogram produced according to the display gray-scale values of M-th row in an embodiment of the present disclosure;

DETAILED DESCRIPTION

The technical solutions in the embodiments of the present disclosure will be described clearly and completely with reference to the drawings in the embodiments of the present disclosure, and it is obvious that the embodiments described are only some embodiments of the present disclosure, rather than all embodiments. All other embodiments, which can be derived by a person skilled in the art from the embodiments disclosed herein without making any creative effort, shall fall within the scope of the present disclosure.

Figure 1:
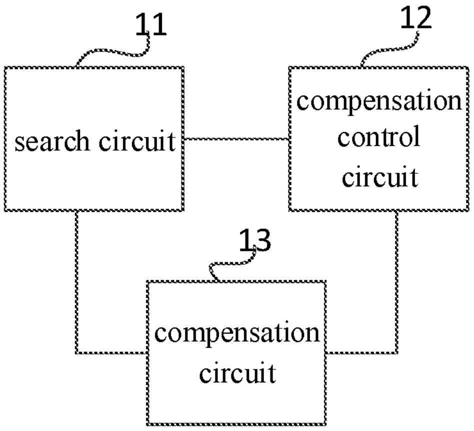
FIG. 1 is a structural diagram of a display compensation module according to an embodiment of the present disclosure.

The display compensation module according to the embodiment of the present disclosure is applied to a display panel, the display panel includes a plurality of rows and a plurality of columns of sub-pixels, as shown in FIG. 1, the display compensation module includes a search circuit 11, a compensation control circuit 12 and a compensation circuit 13, where, the search circuit 11 is configured to obtain, based on a display gray-scale value of an M-th row in a N-th frame of display data, a display gray-scale value of an M-th row in a (N−1)-th frame of display data and a preset compensation gray-scale search table, compensation information corresponding to the display gray-scale value of the M-th row in the N-th frame of display data and the display gray-scale value of the M-th row in the (N−1)-th frame of display data, and when the compensation information indicates that the display gray-scale values of at least part of columns of sub-pixels in the M-th row in the display panel increase from the (N−1)-th frame to the N-th frame, apply the first control signal to the compensation control circuit; N is an integer greater than 1, M is a positive integer;

the compensation control circuit 12 is electrically connected to the search circuit and is configured to: determine whether to perform a gray-scale compensation according to the display gray-scale value of the M-th row in the N-th frame of display data after receiving a first control signal, and send a compensation control signal to the compensation circuit when the gray-scale compensation is needed, and send a second control signal to the compensation circuit when the gray-scale compensation is not needed;

the compensation circuit 13 is electrically connected to the search circuit and the compensation control circuit, and is configured to: receive the compensation information, compensate the display gray-scale value of the M-th row in the N-th frame of display data according to a compensation display gray-scale value in the compensation information after receiving the compensation control signal, to obtain and output the compensated display gray-scale value, and control and output the display gray-scale value of the M-th row in the N-th frame of display data after receiving the second control signal.

In at least one embodiment of the present disclosure, the display panel may be an AMOLED (Active-matrix organic light-emitting diode) display panel. When the AMOLED display panel displays a preset display picture and is switched from a low display gray-scale to a high display gray-scale, the color and the brightness of a first frame of picture have deviation. Based on this, the embodiment of the present disclosure provides a display compensation module, where the search circuit 11 obtains compensation information corresponding to an display gray-scale value of an M-th row in an N-th frame of display data and an display gray-scale value of an M-th row in an N-th-1 frame of display data according to a preset compensation gray-scale search table, and when the compensation information indicates that display gray-scale values of at least part of rows of subpixels in the display panel are increased from an N-th-1 frame, the compensation control circuit 12 determines whether gray-scale compensation is needed according to the display gray-scale value of an M-th row in the N-th frame of display data; when the compensation control circuit 12 judges that gray-scale compensation is needed, the compensation circuit 12 compensates the display gray-scale value of the M-th row in the N-th frame of display data according to the compensation display gray-scale value in the compensation information to obtain and output a compensated display gray-scale value; and when the compensation control circuit 12 judges that the display gray-scale value does not need to be compensated, directly outputting the display gray-scale value of the M-th row in the N-th frame of display data. The display compensation module according to at least one embodiment of the present disclosure may perform gray-scale compensation on an Display gray-scale value of the M-th row in an N-th frame of display data when the display compensation module is switched from a low display gray-scale to a high display gray-scale and when the compensation control circuit 12 and the search circuit 11 determine that gray-scale compensation is needed according to the display gray-scale value of the M-th row in the N-th frame of display data, so that color and brightness do not deviate, and poor display is avoided.

In some embodiments, the display gray-scale value output by the compensation circuit 13 may be output to a display memory, so that the display gray-scale value is called when displaying.

In at least one embodiment of the disclosure, the operation of compensating for the display gray-scale value of an M-th row in the N-th frame of display data may be performed before the N-th frame starts.

Figure 2:
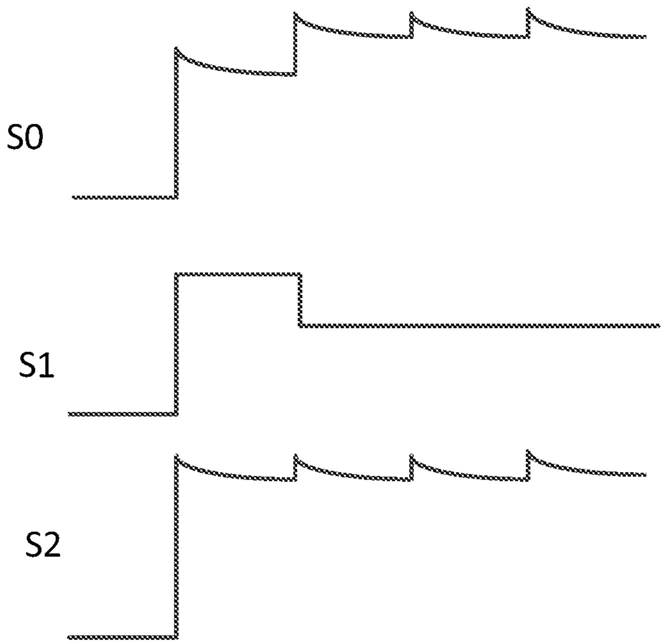
FIG. 2 is a schematic diagram of the brightness S0 before gray-scale compensation, the compensation display gray-scale value S1, and the brightness S2 after gray-scale compensation when the compensation control circuit determines that gray-scale compensation is needed according to the display gray-scale value of the M-th row in the N-th frame of display data after the low display gray-scale is switched to the high display gray-scale.

As shown in FIG. 2, when the display gray-scale is switched from the low display gray-scale to the high display gray-scale, and the compensation control circuit determines that the gray-scale compensation is needed according to the display gray-scale value of the M-th column in the N-th frame of display data, reference numeral S0 is a schematic diagram of the brightness before the gray-scale compensation, reference numeral S1 is a schematic diagram of the compensation display gray-scale value, and reference numeral S2 is a schematic diagram of the brightness after the gray-scale compensation. It can be known from S2 that, by using the display compensation module according to at least one embodiment of the present disclosure, the brightness does not deviate when switching from the low display gray-scale to the high display gray-scale.

In some embodiments, the search circuit may be further configured to send a third control signal to the compensation circuit when the compensation information indicates that the display gray-scale values of all the sub-pixels in the M-th row in the display panel do not increase from the N-th-1 frame to the N-th frame;

- the compensation circuit is configured to output the display gray-scale value of the M-th row in the N-th frame of display data after receiving the third control signal.

When the compensation information indicates that the display gray-scale values of all the sub-pixels in the M-th row in the display panel do not increase from the (N−1)-th frame to the N-th frame, the search circuit sends a third control signal to the compensation circuit, so that the compensation circuit controls to directly output the display gray-scale value in the M-th row in the N-th frame of display data without performing gray-scale compensation.

In at least one embodiment of the present disclosure, the obtaining, by the search circuit 11, the compensation information corresponding to the display gray-scale value of an M-th row in the N-th frame of display data and the display gray-scale value of an M-th row in the (N−1)-th frame of display data according to the display gray-scale value of an M-th row in the N-th frame of display data, the display gray-scale value of an M-th row in the (N−1)-th frame of display data, and the preset compensation gray-scale search table means:

- the search circuit 11 compares the display gray-scale value of the M-th row in the N-th frame of display data with the display gray-scale value of the M-th row in the (N−1)-th frame of display data to obtain a comparison result;
- when the comparison result indicates that the display gray-scale values of all the sub-pixels in the M-th row in the display panel do not increase from the (N−1)-th frame to the N-th frame, obtaining compensation information indicating that the display gray-scale values of all the sub-pixels in the M-th row in the display panel do not increase from the (N−1)-th frame to the N-th frame;
- when the comparison result indicates that the display gray-scale value of at least a part of sub-pixels in the M-th row in the display panel increase from the (N−1)-th frame to the N frame, obtaining compensation information indicating that the display gray-scale value of at least a part of sub-pixels in the M-th row in the display panel increase from the (N−1)-th frame to the N frame;
- for the sub-pixels in the corresponding M-th row with the increased display gray-scale value from the frame N−1 to the frame N, obtaining the corresponding compensation display gray-scale value based on a display gray-scale value of an M-th row in a N-th frame of display data, a display gray-scale value of an M-th row in a (N−1)-th frame of display data and a preset compensation gray-scale search table, to obtain the compensation information, where the compensation information includes the compensation display gray-scale value.

Optionally, when the display gray-scale value of current frame is greater than the display gray-scale value of the previous frame, the compensation display gray-scale value corresponding to the display gray-scale value of the previous frame and display gray-scale value of the current frame is recorded in the compensation gray-scale search table;

- in at least one embodiment of the present disclosure, in the compensation gray-scale search table, a plurality of display gray-scale values of current frame and a plurality of display gray-scale value of the previous frame may be given, where display gray-scale value of the current frames may be, for example, 0, 15, 31, 47, 63, 79, 95, 111, 127, 143, 159, 175, 191, 207, 223, 239, and 255, and the display gray-scale value of the previous frame may be, for example, 0, 15, 31, 47, 63, 79, 95, 111, 127, 143, 159, 175, 191, 207, 223, 239, and 255, and in the compensation gray-scale search table, when display gray-scale value of the current frame is greater than the display gray-scale value of the previous frame, compensation display gray-scale values corresponding to the display gray-scale value of the previous frame and display gray-scale value of the current frame are recorded;
- in addition, in the compensation gray-scale search table, when the display gray-scale value of the current frame is equal to the display gray-scale value of the previous frame, the corresponding compensation display gray-scale value is also recorded, and the compensation display gray-scale value is not used for actual compensation but is convenient for calculating the actual compensation display gray-scale value by adopting a linear interpolation algorithm;

in some embodiments, when the display gray-scale value of the sub-pixel of the corresponding column in the M-th row in the N-th frame of display data is not any of the above display gray-scale values of the current frame; and/or when the display gray-scale value of the sub-pixel at the corresponding column of the M-th row in the (N−1)-th frame of display data is not any of the display gray-scale values of the previous frame, a linear interpolation algorithm can be adopted to calculate the compensation display gray-scale value corresponding to the display gray-scale value of the sub-pixel at the corresponding column of the M-th row in the N-th frame of display data and the display gray-scale value of the sub-pixel at the corresponding column of the M-th row in the (N−1)-th frame of display data;

for example, when the display gray-scale value of the current frame is 0 and the display gray-scale value of the current frame is 0 for the red subpixel, the corresponding compensation display gray-scale value is a1_*r*, when the display gray-scale value of the current frame is 0 and the display gray-scale value of the current frame is 15, the corresponding compensation display gray-scale value is a2_*r*, then when the display gray-scale value of the corresponding column subpixel of the M-th row in the display data of the N−1 frame is 0 and the display gray-scale value of the corresponding column subpixel of the M-th row in the display data of the N−1 frame is 12, the corresponding compensation display gray-scale value may be a1_*r*+12 (a 2_*r*−a1_*r*)/15.

In at least one embodiment of the present disclosure, in the compensation gray-scale search table, for the sub-pixels with different colors, different compensation display gray-scale values may be given corresponding to the same previous frame display gray-scale value and the same current frame display gray-scale value, but not limited thereto.

Optionally, when the display gray-scale value of the sub-pixel in the corresponding column in the M-th row in the N-th frame of display data is greater than the display gray-scale value of the sub-pixel in the corresponding column in the M-th row in the N-th-1 frame of display data, the corresponding compensation display gray-scale value is greater than 0, so as to improve the light-emitting luminance of the sub-pixel in the corresponding column in the M-th row at the N-th frame, and improve the color and luminance deviation phenomenon.

In at least one embodiment of the present disclosure, the compensation circuit 13 compensates the display gray-scale value in the M-th row in the N-th frame of display data according to the compensation display gray-scale value in the compensation information, and the obtaining and outputting the compensated display gray-scale value may be: and when the display gray-scale value of the sub-pixel of the corresponding column of the M-th row in the N-th frame of display data is larger than the display gray-scale value of the sub-pixel of the corresponding column of the M-th row in the (N−1)-th frame of display data, adding the display gray-scale value of the sub-pixel of the corresponding column of the M-th row in the N-th frame of display data and the corresponding compensation display gray-scale value to obtain and output the compensated display gray-scale value.

In some embodiments, when the comparison result indicates that the display gray-scale value of the M-th row of at least some of the column sub-pixels in the display panel increases from the (N−1)-th frame to the N-th frame, the corresponding compensated display gray-scale value may be set to 0 when the display gray-scale value of the M-th row of the display data in the N-th frame is equal to or less than the display gray-scale value of the M-th row of the display data in the (N−1)-th frame.

FIG. 3 is a schematic diagram of at least one embodiment of the compensation gray-scale search table when display gray-scale values of current frame of 0, 15, 31, 47, 63, 79, 95, 111, 127, 143, 207, 223, 239, and 255 and a previous frame display gray-scale values of 0, 15, 31, 47, 63, 79, 95, 111, 127, 143, 159, 175, 191, 207, 223, 239, and 255. In FIG. 3, only the current frame showing the gray-scale values of 0, 15, 31, 223, 239, and 255 and the previous frame showing the portions of the gray-scale values of 0, 15, 31, 223, 239, and 255 are shown.

In FIG. 3, reference numeral a1_*r* is a first red compensation display gray-scale value, reference numeral a1_*g* is a first green compensation display gray-scale value, and reference numeral a1_*b* is a first blue compensation display gray-scale value;

a second red compensation display gray-scale value denoted by a2_*r*, a second green compensation display gray-scale value denoted by a2_*g*, and a second blue compensation display gray-scale value denoted by a2_*b;* b2_*r*, b2_*g*, b2_*b*, and b2_*b* are the third red compensation display gray-scale values;

a fourth red compensation display gray-scale value denoted by a3_*r*, a fourth green compensation display gray-scale value denoted by a3_*g*, and a fourth blue compensation display gray-scale value denoted by a3_*b;* b3_*r*, b3_*g*, b3_*b*, and b3_*b;* c3_*r*, c3_*g*, and c3_*b* are the sixth red, green, and blue compensated display gray-scales, respectively;

a seventh red compensation display gray-scale value denoted by a14_*r*, a seventh green compensation display gray-scale value denoted by a14_*g*, and a seventh blue compensation display gray-scale value denoted by a14_*b;* the reference numeral b14_*r* is the eighth red compensation display gray-scale value, the reference numeral b14_*g* is the eighth green compensation display gray-scale value, and the reference numeral b14_*b* is the eighth blue compensation display gray-scale value;

a ninth red compensation display gray-scale value denoted by reference numeral c14_*r*, a ninth green compensation display gray-scale value denoted by reference numeral c14_*g*, and a ninth blue compensation display gray-scale value denoted by reference numeral c14_*b;* a tenth red compensation display gray-scale value denoted by reference numeral n14_*r*, a tenth green compensation display gray-scale value denoted by reference numeral n14_*g*, and a tenth blue compensation display gray-scale value denoted by reference numeral n14_*b;* an eleventh red compensation display gray-scale value denoted by a15_*r*, an eleventh green compensation display gray-scale value denoted by a15_*g*, and an eleventh blue compensation display gray-scale value denoted by a15_*b;* a twelfth red compensation display gray-scale value denoted by b15_*r*, a twelfth green compensation display gray-scale value denoted by b15_*g*, and a twelfth blue compensation display gray-scale value denoted by b15_*b;* a thirteenth red compensation display gray-scale value denoted by reference numeral c15_*r*, a thirteenth green compensation display gray-scale value denoted by reference numeral c15_*g*, and a thirteenth blue compensation display gray-scale value denoted by reference numeral c15_*b;* a fourteenth red compensation display gray-scale value denoted by the reference numeral n15_*r*, a fourteenth green compensation display gray-scale value denoted by the reference numeral n15_*g*, and a fourteenth blue compensation display gray-scale value denoted by the reference numeral n15_*b;* a fifteenth red compensation display gray-scale value is denoted by reference numeral o15_*r*, a fifteenth green compensation display gray-scale value is denoted by reference numeral o15_*g*, and a fifteenth blue compensation display gray-scale value is denoted by reference numeral o15_*b;* a sixteenth red compensation display gray-scale value denoted by a16_*r*, a sixteenth green compensation display gray-scale value denoted by a16_*g*, and a sixteenth blue compensation display gray-scale value denoted by a16_*b;* a seventeenth red compensation display gray-scale value is denoted by a reference numeral b16_*r*, a seventeenth green compensation display gray-scale value is denoted by a reference numeral b16_*g*, and a seventeenth blue compensation display gray-scale value is denoted by a reference numeral b16_*b;* the reference numeral c16_*r* is the eighteenth red compensation display gray-scale value, the reference numeral c16_*g* is the eighteenth green compensation display gray-scale value, and the reference numeral c16_*b* is the eighteenth blue compensation display gray-scale value;

a nineteenth red compensation display gray-scale value denoted by the reference numeral n16_*r*, a nineteenth green compensation display gray-scale value denoted by the reference numeral n16_*g*, and a nineteenth blue compensation display gray-scale value denoted by the reference numeral n16_*b;* a twenty-red compensation display gray-scale value is denoted by reference numeral o16_*r*, a twenty-green compensation display gray-scale value is denoted by reference numeral o16_*g*, and a twenty-blue compensation display gray-scale value is denoted by reference numeral o16_*b;* the twenty-first red compensation display gray-scale value is denoted by reference numeral p16_*r*, the twenty-first green compensation display gray-scale value is denoted by reference numeral p16_*g*, and the twenty-first blue compensation display gray-scale value is denoted by reference numeral p16_*b*.

In at least one embodiment of the present disclosure, the compensation control circuit is configured to determine that gray-scale compensation is needed when it is determined that an M-th row of display gray-scale values in the N-th frame of display data is a row of display gray-scale values in display data corresponding to a predetermined display image, and determine that gray-scale compensation is not needed when it is determined that display gray-scale value of the M-th row in the N-th frame of display data is not a row of display gray-scale values in display data corresponding to a predetermined display image.

Optionally, the predetermined display screen may include a horizontally extending, bar-shaped or strip-shaped screen on a black background or a gray background. In at least one embodiment of the present disclosure, the transverse direction may be substantially the same as the extending direction of the gate row, but is not limited thereto.

In actual display, not every row of data needs to be compensated, complex color pictures or characters need to be avoided from being compensated (generally, the brightness of the characters is higher), and gray-scale compensation is not needed when the current row of pictures is a black background or a gray background picture; the horizontal stripe or band-shaped picture converted from low gray-scale to high gray-scale needs gray-scale compensation.

In some embodiments, the compensation control circuit may be further configured to create a histogram according to an display gray-scale value of an M-th row in the N-th frame of display data, and determine whether the display gray-scale value of an M-th row in the N-th frame of display data is a row display gray-scale value in display data corresponding to a predetermined display screen according to the histogram.

Figure 5:
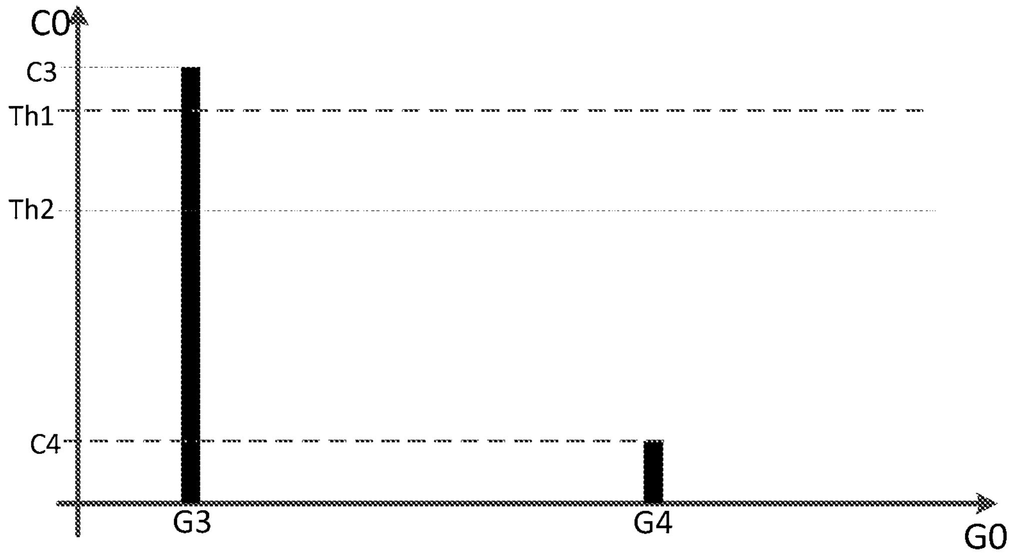
FIG. 5 is a schematic diagram of a histogram produced according to the display gray-scale values of M-th row in another embodiment of the present disclosure.

FIG. 4 is a schematic diagram of a histogram produced according to one embodiment of the M-th row display gray-scale values; FIG. 5 is a schematic diagram of a histogram produced according to another embodiment in which the M-th row shows gray-scale values.

In FIGS. 4 and 5, the abscissa indicates the display gray-scale value G0, and the ordinate indicates the number C0 of display gray-scale values in display gray-scale value of the M-th row; for example, when the display gray-scale values in the M-th row include 1200 first display gray-scale values and 122 second display gray-scale values, two longitudinal straight rows exist in the histogram, a horizontal axis corresponding to a first longitudinal straight row is the first display gray-scale value, and a vertical axis corresponding to a highest point of the first longitudinal straight row is 1200; the horizontal axis corresponding to the second longitudinal row is the second display gray-scale value, and the vertical axis corresponding to the highest point of the second longitudinal row is 122.

As shown in FIG. 4, reference numeral G1 is a first display gray-scale value, and reference numeral G2 is a second display gray-scale value; in FIG. 4, there are two longitudinal straight rows, a horizontal axis corresponding to a first longitudinal straight row is a first display gray-scale value G1, and a vertical axis corresponding to a highest point of the first longitudinal straight row is a first number C1; the horizontal axis corresponding to the second longitudinal straight row is a second display gray-scale value G2, the vertical axis winning the highest point of the second longitudinal straight row is a second number C2, and C1 is more than C2; g1 is greater than G2;

in FIG. 4, reference numeral Th1 is a first predetermined number and reference numeral Th2 is a second predetermined number; th1 is greater than Th 2;

as shown in FIG. 4, if C1 is greater than Th1, C1 is greater than Th2, and the absolute value of the difference between G1 and G2 is less than Th3, it can be said that the M-Th row display gray-scale is a row display gray-scale in the display data corresponding to the horizontally extending stripe or band-shaped picture under the black background or gray background, and it is determined that gray-scale compensation is needed. Wherein, Th3 is a preset gray-scale difference value, Th3 is greater than 0;

as shown in FIG. 5, reference numeral G3 is a third display gray-scale value, and reference numeral G4 is a fourth display gray-scale value; in FIG. 5, there are two longitudinal straight rows, the horizontal axis corresponding to the first longitudinal straight row is the third display gray-scale value G3, and the vertical axis corresponding to the highest point of the first longitudinal straight row is the third number C3; the horizontal axis corresponding to the second longitudinal straight row is a fourth display gray-scale value G4, the vertical axis corresponding to the highest point of the second longitudinal straight row is a fourth number C4, and C3 is more than C4; g3 is less than G4;

in FIG. 5, reference numerals Th1 are the first predetermined numbers, reference numerals Th2 are the second predetermined numbers, and reference numerals Th3 are the predetermined gray-scale value differences; th1 is greater than Th 2; th3 is greater than 0;

as can be seen from FIG. 5, if C3 is greater than Th1, C3 is greater than Th2, and the absolute value of the difference between G3 and G4 is greater than Th3, it can be said that the display gray-scale value of the M-Th row is not a display gray-scale value of one row in the display data corresponding to the horizontally extending stripe-shaped or band-shaped screen under the black background or the gray background, and it is determined that the gray-scale compensation is not needed.

In some embodiments, the histogram may be converted according to a predetermined algorithm to obtain a corresponding gain map.

Figure 6:
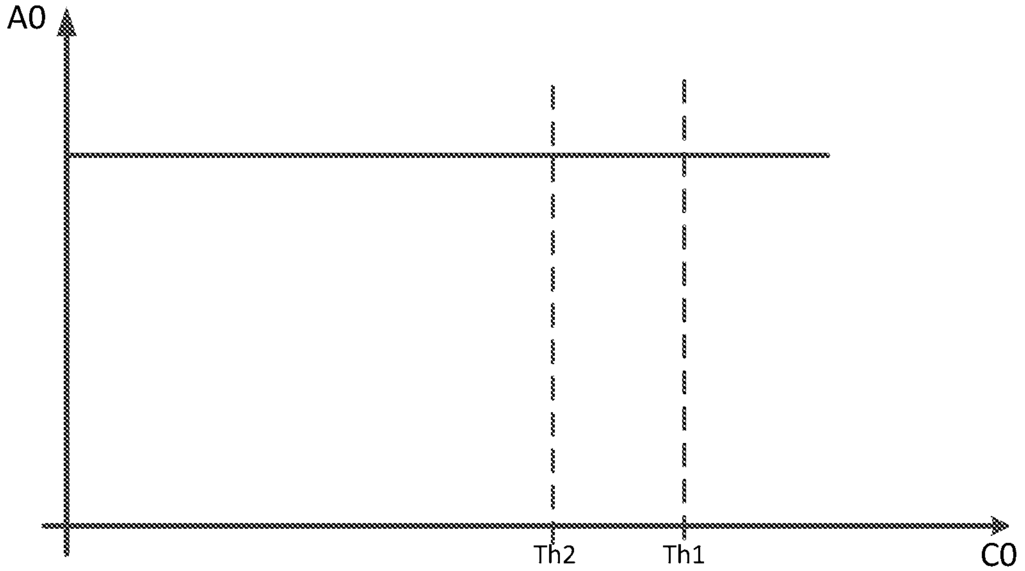
FIG. 6 is a view of the gain corresponding to the histogram shown in FIG. 4.
Figure 7:
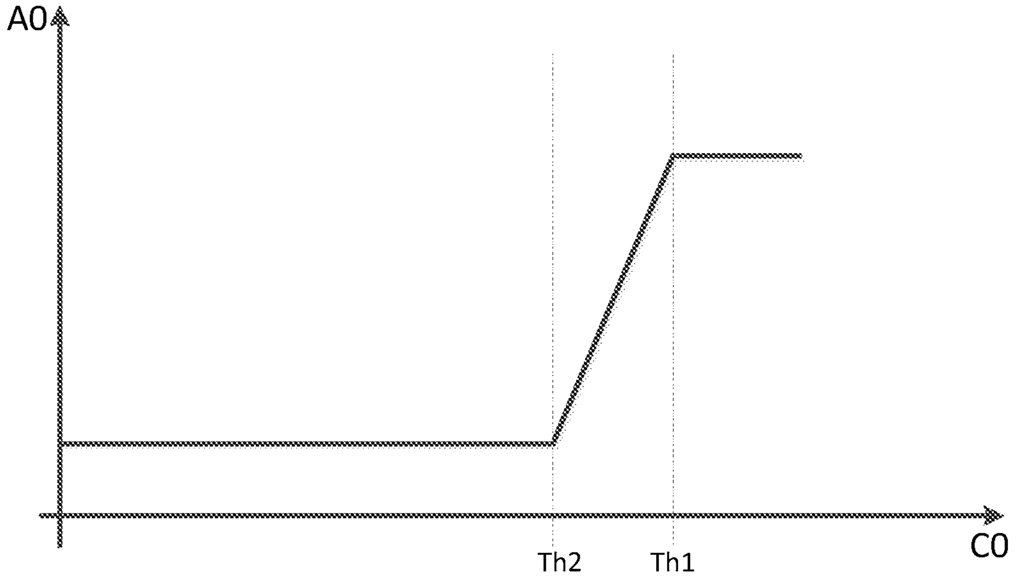
FIG. 7 is a view of the gain corresponding to the histogram shown in FIG. 5.

FIG. 6 is a graph of the gain corresponding to the histogram shown in FIG. 4; FIG. 7 is a graph of the gain corresponding to the histogram shown in FIG. 5;

in FIGS. 6 and 7, the vertical axis represents a gain a0, and the horizontal axis represents the number C0 of display gray-scale values in the display gray-scale value of the M-th row;

in FIGS. 6 and 7, reference numeral Th1 denotes a first predetermined number, and reference numeral Th2 denotes a second predetermined number.

In at least one embodiment of the gain map shown in FIG. 6, the gain is equal to 1.

In at least one embodiment of the gain map shown in FIG. 7, when C0 is between 0 and Th2, the gain is equal to 0; when C0 is greater than Th1, the gain is equal to 1.

In at least one embodiment of the present disclosure, when the compensation information indicates that the display gray-scale value of the M-th row of at least partial column sub-pixels in the display panel increases from the (N−1)-th frame to the (N−1)-th frame, the compensation information includes the compensated display gray-scale value corresponding to the M-th row of the N-th frame of display data and the M-th row of the (N−1)-th frame of display data.

Figure 8:
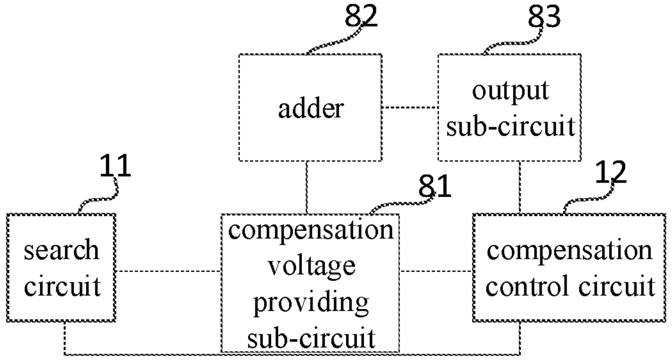
FIG. 8 is a structural diagram of a display compensation module according to at least one embodiment of the disclosure.

Optionally, as shown in FIG. 8, on the basis of the embodiment of the display compensation module shown in FIG. 1, the compensation circuit includes a compensation voltage providing sub-circuit 81, an adder 82 and an output sub-circuit 83;

the compensation control circuit 12 is electrically connected to the compensation voltage providing sub-circuit 81 and the output sub-circuit 83, and is configured to send a compensation control signal to the compensation voltage providing sub-circuit 81 and the output sub-circuit 83 when it is determined that gray-scale compensation is needed, and send a second control signal to the output sub-circuit 83 when it is determined that gray-scale compensation is not needed;

the compensation voltage providing sub-circuit 81 is electrically connected to the search circuit 11 and the adder 82, respectively, and is configured to receive the compensation information from the search circuit 11 and provide the compensation display gray-scale value in the compensation information to the adder 82 after receiving the compensation control signal;

the output sub-circuit 83 is electrically connected to the adder 82, and is configured to control the adder 82 to compensate the display gray-scale value of an M-th row in the N-th frame of display data according to the compensation display gray-scale value in the compensation information after receiving the compensation control signal, so as to obtain a compensated display gray-scale value, and the output sub-circuit 83 is further configured to output the compensated display gray-scale value, and is configured to control to output the display gray-scale value of an M-th row in the N-th frame of display data after receiving the second control signal.

In at least one embodiment of the present disclosure, the compensation circuit may include a compensation voltage providing sub-circuit 81, an adder 82, and an output sub-circuit 83; when the compensation control circuit 12 determines that gray-scale compensation is needed, the compensation control circuit 12 sends a compensation control signal to the compensation voltage providing sub-circuit 81 and the output sub-circuit 83, and after receiving the compensation control signal, the compensation voltage providing sub-circuit 81 provides a compensation display gray-scale value to the adder; after receiving the compensation control signal, the output sub-circuit 83 controls the adder 82 to compensate the display gray-scale value of the M-th row in the N-th frame of display data according to the display gray-scale value, so as to obtain a compensated display gray-scale value; the output sub-circuit 83 outputs the compensated display gray-scale value; when the compensation control circuit 12 determines that gray-scale compensation is not needed, the compensation control circuit 12 provides a second control signal to the output sub-circuit 83, and when the output sub-circuit 83 receives the second control signal, the output sub-circuit 83 controls to directly output the display gray-scale value of the M-th row in the N-th frame of display data.

In some embodiments, the search circuit 11 may be further configured to send a third control signal to the output sub-circuit 83 when the compensation information indicates that the display gray-scale values of all the sub-pixels in the M-th row in the display panel do not increase from the N-th-1 frame to the N-th frame;

the output sub-circuit 83 is configured to output a display gray-scale value of an M-th row in the N-th frame of display data after receiving the third control signal.

In at least one embodiment of the present disclosure, when the compensation information indicates that the display gray-scale values of all the sub-pixels in the M-th row in the display panel do not rise from the N-th-1 frame to the N-th frame, the search circuit 11 may send a third control signal to the output sub-circuit 83, and when the output sub-circuit 83 receives the third control signal, the output sub-circuit 83 directly outputs the display gray-scale value in the M-th row in the N-th frame of display data.

Figure 9:
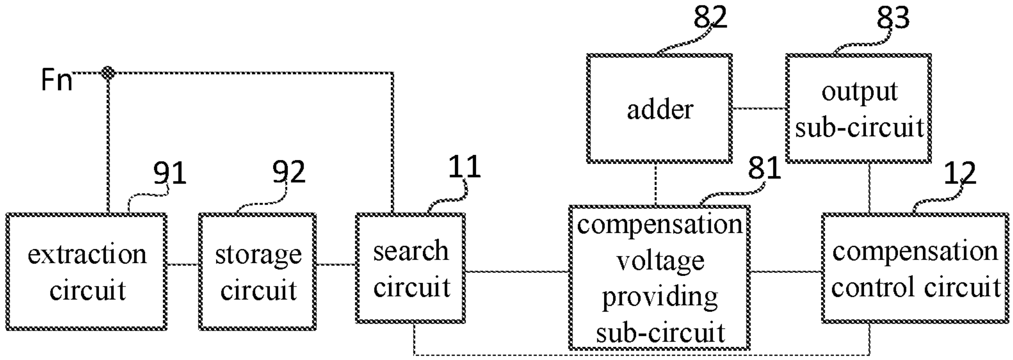
FIG. 9 is a structural diagram of a display compensation module according to at least one embodiment of the disclosure.

Optionally, on the basis of at least one embodiment of the display compensation module shown in FIG. 8, as shown in FIG. 9, the display compensation module according to at least one embodiment of the present disclosure may further include an extraction circuit 91 and a storage circuit 92;

the extracting circuit 91 is configured to extract a display gray-scale value of each rows in the N-th frame of display data and a display gray-scale value of each rows in the (N−1)-th frame of display data, and store a display gray-scale value of each rows in the (N−1)-th frame of display data in the storing circuit 92 before the N-th frame begins;

the search circuit 11 is configured to receive the N-th frame of display data Fn before the N-th frame begins, call a display gray-scale value of each rows in the (N−1)-th frame of display data in the storage circuit 92, and obtain compensation information corresponding to an M-th row of display gray-scale values in the N-th frame of display data and an M-th row of display gray-scale values in the (N−1)-th frame of display data according to a preset compensation gray-scale search table.

In at least one embodiment of the present disclosure, the storage circuit 92 may be a Row Memory or a Frame Memory, but not limited thereto.

When the display compensation module according to at least one embodiment of the present disclosure shown in FIG. 9 is in operation, the extracting circuit 91 extracts a display gray-scale value of each rows in the N-th frame of display data and a display gray-scale value of each rows in the (N−1)-th frame of display data, and stores a display gray-scale value of each rows in the (N−1)-th frame of display data in the storage circuit 92; before the N-th frame begins, the search circuit 11 calls a display gray-scale value of each rows in the N-th-1 th frame of display data stored in the storage circuit 92, receives the N-th frame of display data Fn, and obtains compensation information corresponding to an M-th row of display gray-scale values in the N-th frame of display data and an M-th row of display gray-scale values in the N-th-1 th frame of display data according to a preset compensation gray-scale search table.

When the memory circuit is a row memory, display data may be stored in the row display in units of rows, and the storage form may be divided into a W mode and an RGB (red, green, and blue) mode.

When the display panel works in a black-and-white picture display mode or a gray-scale display mode, the display gray-scale values of the sub-pixels with different colors in one pixel are the same, at the moment, the display gray-scale values can be stored by taking the pixel as a unit, and the sub-pixels with different colors in the same pixel are subjected to gray-scale compensation in the same proportion during the gray-scale compensation;

when the display panel works in a color picture display mode, the display gray-scale values of the sub-pixels with different colors in one pixel can be different, at the moment, the sub-pixels are used as units to store the display gray-scale values, and during gray-scale compensation, the sub-pixels with different colors in the same pixel are subjected to gray-scale compensation respectively.

The display compensation method provided by the embodiment of the disclosure is applied to the display compensation module, and includes the following steps:

obtaining, by the search circuit, based on a display gray-scale value of an M-th row in a N-th frame of display data, a display gray-scale value of an M-th row in a (N−1)-th frame of display data and a preset compensation gray-scale search table, compensation information corresponding to the display gray-scale value of the M-th row in the N-th frame of display data and the display gray-scale value of the M-th row in the (N−1)-th frame of display data, and when the compensation information indicates that the display gray-scale values of at least part of columns of sub-pixels in the M-th row in the display panel increase from the (N−1)-th frame to the N-th frame, applying, by the search circuit, the first control signal to the compensation control circuit; N is an integer greater than 1, M is a positive integer;

determining, by the compensation control circuit, whether to perform a gray-scale compensation according to the display gray-scale value of the M-th row in the N-th frame of display data after receiving a first control signal, and sending, by the compensation control circuit, a compensation control signal to the compensation circuit when the compensation control circuit determines that the gray-scale compensation is needed, and sending, by the compensation control circuit, a second control signal to the compensation circuit when the compensation control circuit determines that the gray-scale compensation is not needed;

receiving, by the compensation circuit, the compensation information, compensating, by the compensation circuit, the display gray-scale value of the M-th row in the N-th frame of display data according to a compensation display gray-scale value in the compensation information after receiving the compensation control signal, to obtain and output the compensated display gray-scale value, and controlling and outputting, by the compensation circuit, the display gray-scale value of the M-th row in the N-th frame of display data after receiving the second control signal.

In the display compensation method according to the embodiment of the disclosure, a search circuit obtains compensation information corresponding to an display gray-scale value of an M-th row in N-th frame of display data and an display gray-scale value of an M-th row in N-th-1 frame of display data according to a preset compensation gray-scale search table, and when the compensation information indicates that the display gray-scale values of at least part of rows of subpixels in the display panel are increased from the N-th-1 frame, the compensation control circuit determines whether gray-scale compensation is needed according to the display gray-scale value of an M-th row in the N-th frame of display data; when the compensation control circuit judges that gray-scale compensation is needed, the compensation circuit compensates the display gray-scale value of the M-th row in the N-th frame of display data according to the compensation display gray-scale value in the compensation information to obtain and output a compensated display gray-scale value; and when the compensation control circuit judges that the display gray-scale value does not need to be compensated, directly outputting the display gray-scale value of the M-th row in the N-th frame of display data. According to the display compensation method, when the low display gray-scale is switched to the high display gray-scale, and when the compensation control circuit and the searching circuit judge that the gray-scale compensation is needed according to display gray-scale value of the M-th row in the N-th frame of display data, display gray-scale value of the M-th row in the N-th frame of display data are subjected to gray-scale compensation, so that the color and the brightness are prevented from deviating, and poor display is avoided.

In some embodiments, the display compensation method according to at least one embodiment of the present disclosure may further include:

sending, by the search circuit, a third control signal to the compensation circuit when the compensation information indicates that the display gray-scale values of all the sub-pixels in the M-th row in the display panel do not increase from the (N−1)-th frame to the N-th frame;

outputting, by the compensation circuit, the display gray-scale value of the M-th row in the N-th frame of display data after receiving the third control signal.

Optionally, the determining, by the compensation control circuit, whether to perform the gray-scale compensation according to the display gray-scale value of the M-th row in the N-th frame of display data includes:

determining, by the compensation control circuit, that the gray-scale compensation is needed when the compensation control circuit determines that the display gray-scale value of the M-th row in the N-th frame of display data is the display gray-scale value of the one row in the display data corresponding to a predetermined display image, and determining, by the compensation control circuit, that the gray-scale compensation is not needed when the compensation control circuit determines that the display gray-scale value of the M-th row in the N-th frame of display data is not the display gray-scale value of one row in the display data corresponding to a predetermined display image.

Optionally, the predetermined display screen may include a horizontally extending, bar-shaped or strip-shaped screen on a black background or a gray background. In at least one embodiment of the present disclosure, the transverse direction may be substantially the same as the extending direction of the gate row, but is not limited thereto.

In actual display, not every row of data needs to be compensated, complex color pictures or characters need to be avoided from being compensated (generally, the brightness of the characters is higher), and gray-scale compensation is not needed when the current row of pictures is a black background or a gray background picture; the horizontal stripe or band-shaped picture converted from low gray-scale to high gray-scale needs gray-scale compensation.

In at least one embodiment of the present disclosure, the compensation circuit includes a compensation voltage supply sub-circuit, an adder, and an output sub-circuit; the display compensation method further includes:

when the compensation control circuit determines that the gray-scale compensation is needed, sending the compensation control signal to the compensation voltage supply sub-circuit and the output sub-circuit, and when the compensation control circuit determines that the gray-scale compensation is not needed, sending the second control signal to the output sub-circuit;

receiving, by the compensation voltage supply sub-circuit, the compensation information from the search circuit, and supplying, by the compensation voltage supply sub-circuit, the compensation display gray-scale value in the compensation information to the adder after receiving the compensation control signal;

controlling, by the output sub-circuit, the adder to compensate the display gray-scale value of the M-th row in the N-th frame of display data according to the compensation display gray-scale value in the compensation information after receiving the compensation control signal, to obtain the compensated display gray-scale value, and outputting, by the output sub-circuit, the compensated display gray-scale value and controlling and outputting, by the output sub-circuit, the display gray-scale value of the M-th row in the N-th frame of display data after receiving the second control signal.

In at least one embodiment of the present disclosure, the compensation circuit may include a compensation voltage supply sub-circuit, an adder, and an output sub-circuit; when the compensation control circuit judges that gray-scale compensation is needed, the compensation control circuit sends a compensation control signal to a compensation voltage supply sub-circuit and the output sub-circuit, and the compensation voltage supply sub-circuit supplies a compensation display gray-scale value to the adder after receiving the compensation control signal; after receiving the compensation control signal, the output sub-circuit controls the adder to compensate the display gray-scale value of the M-th row in the N-th frame of display data according to the display gray-scale value so as to obtain a compensated display gray-scale value; the output sub-circuit outputs the compensated display gray-scale value; when the compensation control circuit judges that gray-scale compensation is not needed, the compensation control circuit provides a second control signal to the output sub-circuit, and when the output sub-circuit receives the second control signal, the output sub-circuit controls to directly output the display gray-scale value of the M-th row in the N-th frame of display data.

Optionally, the display compensation method according to at least one embodiment of the present disclosure further includes: sending, by the search circuit, a third control signal to the output sub-circuit when the compensation information indicates that the display gray-scale values of all sub-pixels in the M-th row in the display panel do not increase from the (N−1)-th frame to the N-th frame;

outputting, by the output sub-circuit, the display gray-scale value of the M-th row in the N-th frame of display data after receiving the third control signal.

In at least one embodiment of the present disclosure, when the compensation information indicates that the display gray-scale values of all the sub-pixels in the M-th row in the display panel do not rise from the N-th-1 th frame to the N-th frame, the search circuit may send a third control signal to the output sub-circuit, and when the output sub-circuit receives the third control signal, the output sub-circuit directly outputs the display gray-scale value in the M-th row in the N-th frame of display data.

The display device of the embodiment of the disclosure includes a display panel and the display compensation module.

The display device provided by the embodiment of the disclosure can be any product or component with a display function, such as a mobile phone, a tablet computer, a television, a display, a notebook computer, a digital photo frame, a navigator and the like.

While the foregoing is directed to the preferred embodiment of the present disclosure, it will be appreciated that various modifications and adaptations may be made by those skilled in the art without departing from the principles of the disclosure and should be considered as within the scope of the disclosure.

What is claimed is:

1. A display compensation module, applied to a display panel, wherein the display panel comprises a plurality of rows and a plurality of columns of sub-pixels, the display compensation module comprises a search circuit, a compensation control circuit and a compensation circuit, wherein the search circuit is configured to obtain, based on a display gray-scale value of an M-th row in a N-th frame of display data, a display gray-scale value of an M-th row in a (N−1)-th frame of display data and a preset compensation gray-scale search table, compensation information corresponding to the display gray-scale value of the M-th row in the N-th frame of display data and the display gray-scale value of the M-th row in the (N−1)-th frame of display data, and when the compensation information indicates that the display gray-scale values of at least part of columns of sub-pixels in the M-th row in the display panel increase from the (N−1)-th frame to the N-th frame, apply a first control signal to the compensation control circuit; N is an integer greater than 1, M is a positive integer; the compensation control circuit is electrically connected to the search circuit and is configured to: determine whether to perform a gray-scale compensation according to the display gray-scale value of the M-th row in the N-th frame of display data after receiving the first control signal, and send a compensation control signal to the compensation circuit when the gray-scale compensation is needed, and send a second control signal to the compensation circuit when the gray-scale compensation is not needed; the compensation circuit is electrically connected to the search circuit and the compensation control circuit, and is configured to: receive the compensation information, compensate the display gray-scale value of the M-th row in the N-th frame of display data according to a compensation display gray-scale value in the compensation information after receiving the compensation control signal, to obtain and output the compensated display gray-scale value, and control and output the display gray-scale value of the M-th row in the N-th frame of display data after receiving the second control signal.

2. The display compensation module according to claim 1, wherein the search circuit is further configured to send a third control signal to the compensation circuit when the compensation information indicates that the display gray-scale values of all the sub-pixels in the M-th row in the display panel do not increase from the (N−1)-th frame to the N-th frame;

the compensation circuit is configured to output the display gray-scale value of the M-th row in the N-th frame of display data after receiving the third control signal.

3. The display compensation module according to claim 1, wherein the compensation control circuit is configured to determine that the gray-scale compensation is needed when the compensation control circuit determines that the display gray-scale value of the M-th row in the N-th frame of display data is the display gray-scale value of the one row in the display data corresponding to a predetermined display image, and is configured to determine that gray-scale compensation is not needed when the compensation control circuit determines that the display gray-scale value of the M-th row in the N-th frame of display data is not the display gray-scale value of one row in the display data corresponding to a predetermined display image.

4. The display compensation module according to claim 3, wherein the compensation control circuit is further configured to generate a histogram according to the display gray-scale value of the M-th row in the N-th frame of display data, and determine whether the display gray-scale value of the M-th row in the N-th frame of display data is the display gray-scale value of one row in the display data corresponding to a predetermined display image according to the histogram.

5. The display compensation module according to claim 1, wherein when the compensation information indicates that the display gray-scale values of at least a part of columns of subpixels in the M-th row in the display panel increase from the (N−1)-th frame to the N-th frame, the compensation information comprises a compensation display gray-scale value corresponding to display gray-scale value of the M-th row in the N-th frame of display data and the display gray-scale value of the M-th row in the (N−1)-th frame of display data.

6. The display compensation module according to claim 1, wherein the compensation circuit comprises a compensation voltage supply sub-circuit, an adder, and an output sub-circuit;

the compensation control circuit is electrically connected to the compensation voltage supply sub-circuit and the output sub-circuit and is configured to: send the compensation control signal to the compensation voltage supply sub-circuit and the output sub-circuit when the gray-scale compensation is needed, and send the second control signal to the output sub-circuit when the gray-scale compensation is not needed;

the compensation voltage supply sub-circuit is electrically connected to the search circuit and the adder, and is configured to: receive the compensation information from the search circuit and supply the compensation display gray-scale value in the compensation information to the adder after receiving the compensation control signal;

the output sub-circuit is electrically connected to the adder and configured to control the adder to compensate the display gray-scale value of the M-th row in the N-th frame of display data according to the compensation display gray-scale value in the compensation information after receiving the compensation control signal, to obtain the compensated display gray-scale value, and the output sub-circuit is further configured to output the compensated display gray-scale value and control and output the display gray-scale value of the M-th row in the N-th frame of display data after receiving the second control signal.

7. The display compensation module according to claim 6, wherein the search circuit is further configured to send a third control signal to the output sub-circuit when the compensation information indicates that the display gray-scale values of all sub-pixels in the M-th row in the display panel do not increase from the (N−1)-th frame to the N-th frame;

the output sub-circuit is configured to output the display gray-scale value of the M-th row in the N-th frame of display data after receiving the third control signal.

8. The display compensation module according to claim 1, further search table an extraction circuit and a storage circuit;

the extraction circuit is configured to extract a display gray-scale value of each row in the N-th frame of display data and a display gray-scale value of each row in the (N−1)-th frame of display data, and store a display gray-scale value of each row in the (N−1)-th frame of display data in the storage circuit before the N-th frame;

the search circuit is configured to, before the N-th frame, receive the N-th frame of display data, call the display gray-scale values of all rows in the (N−1)-th frame of display data in the storage circuit, and obtain compensation information corresponding to the display gray-scale value of the M-th row in the N-th frame of display data and the display gray-scale value of the M-th row in the (N−1)-th frame of display data according to the preset compensation gray-scale search table.

9. A display compensation method, applied to the display compensation module according to claim 1, and search table:

obtaining, by the search circuit, based on a display gray-scale value of an M-th row in a N-th frame of display data, a display gray-scale value of an M-th row in a (N−1)-th frame of display data and a preset compensation gray-scale search table, compensation information corresponding to the display gray-scale value of the M-th row in the N-th frame of display data and the display gray-scale value of the M-th row in the (N−1)-th frame of display data, and when the compensation information indicates that the display gray-scale values of at least part of columns of sub-pixels in the M-th row in the display panel increase from the (N−1)-th frame to the N-th frame, applying, by the search circuit, the first control signal to the compensation control circuit; N is an integer greater than 1, M is a positive integer;

determining, by the compensation control circuit, whether to perform a gray-scale compensation according to the display gray-scale value of the M-th row in the N-th frame of display data after receiving a first control signal, and sending, by the compensation control circuit, a compensation control signal to the compensation circuit when the compensation control circuit determines that the gray-scale compensation is needed, and sending, by the compensation control circuit, a second control signal to the compensation circuit when the compensation control circuit determines that the gray-scale compensation is not needed;

receiving, by the compensation circuit, the compensation information, compensating, by the compensation circuit, the display gray-scale value of the M-th row in the N-th frame of display data according to a compensation display gray-scale value in the compensation information after receiving the compensation control signal, to obtain and output the compensated display gray-scale value, and controlling and outputting, by the compensation circuit, the display gray-scale value of the M-th row in the N-th frame of display data after receiving the second control signal.

10. The display compensation method according to claim 9, further search table:

sending, by the search circuit, a third control signal to the compensation circuit when the compensation information indicates that the display gray-scale values of all the sub-pixels in the M-th row in the display panel do not increase from the (N−1)-th frame to the N-th frame;

outputting, by the compensation circuit, the display gray-scale value of the M-th row in the N-th frame of display data after receiving the third control signal.

11. The display compensation method according to claim 9, wherein the determining, by the compensation control circuit, whether to perform the gray-scale compensation according to the display gray-scale value of the M-th row in the N-th frame of display data comprises:

determining, by the compensation control circuit, that the gray-scale compensation is needed when the compensation control circuit determines that the display gray-scale value of the M-th row in the N-th frame of display data is the display gray-scale value of the one row in the display data corresponding to a predetermined display image, and determining, by the compensation control circuit, that the gray-scale compensation is not needed when the compensation control circuit determines that the display gray-scale value of the M-th row in the N-th frame of display data is not the display gray-scale value of one row in the display data corresponding to a predetermined display image.

12. The display compensation method according to claim 9, wherein the compensation circuit comprises a compensation voltage supply sub-circuit, an adder, and an output sub-circuit; the display compensation method further comprises:

when the compensation control circuit determines that the gray-scale compensation is needed, sending the compensation control signal to the compensation voltage supply sub-circuit and the output sub-circuit, and when the compensation control circuit determines that the gray-scale compensation is not needed, sending the second control signal to the output sub-circuit;

receiving, by the compensation voltage supply sub-circuit, the compensation information from the search circuit, and supplying, by the compensation voltage supply sub-circuit, the compensation display gray-scale value in the compensation information to the adder after receiving the compensation control signal;

controlling, by the output sub-circuit, the adder to compensate the display gray-scale value of the M-th row in the N-th frame of display data according to the compensation display gray-scale value in the compensation information after receiving the compensation control signal, to obtain the compensated display gray-scale value, and outputting, by the output sub-circuit, the compensated display gray-scale value and controlling and outputting, by the output sub-circuit, the display gray-scale value of the M-th row in the N-th frame of display data after receiving the second control signal.

13. The display compensation method according to claim 12, further search table:

sending, by the search circuit, a third control signal to the output sub-circuit when the compensation information indicates that the display gray-scale values of all sub-pixels in the M-th row in the display panel do not increase from the (N−1)-th frame to the N-th frame;

outputting, by the output sub-circuit, the display gray-scale value of the M-th row in the N-th frame of display data after receiving the third control signal.

14. A display device search table the display panel and the display compensation module according to claim 1.

* * * * *